(12) United States Patent
Berbee et al.

(10) Patent No.: US 9,534,064 B2
(45) Date of Patent: Jan. 3, 2017

(54) POLYMERIZATION PROCESS TO MAKE LOW DENSITY POLYETHYLENE

(71) Applicant: Dow Global Technologies LLC, Midland, MI (US)

(72) Inventors: Otto J. Berbee, Hulst (NL); Cornelis F. J. den Doelder, Terneuzen (NL); Cornelis J. Hosman, Ijzendijke (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/980,701

(22) Filed: Dec. 28, 2015

(65) Prior Publication Data

US 2016/0115256 A1   Apr. 28, 2016

Related U.S. Application Data

(63) Continuation of application No. 13/876,292, filed as application No. PCT/US2011/052525 on Sep. 21, 2011, now Pat. No. 9,234,055.

(Continued)

(51) Int. Cl.
  *C08F 2/00* (2006.01)
  *C08F 210/00* (2006.01)
  (Continued)

(52) U.S. Cl.
  CPC ............ *C08F 10/02* (2013.01); *C08F 210/02* (2013.01); *C08F 110/02* (2013.01)

(58) Field of Classification Search
  CPC .......... C08F 210/02; C08F 10/02; C08F 2/38; C08F 2/001; C08F 4/34; C08F 110/02; C08F 2500/11; C08F 2500/12; C08F 218/08
  (Continued)

(56) References Cited

U.S. PATENT DOCUMENTS 2,964,515 A    12/1960 Rader
3,485,706 A    12/1969 Evans
(Continued)

FOREIGN PATENT DOCUMENTS

DE    2107945    8/1972
EP    0318058    5/1989
(Continued)

OTHER PUBLICATIONS

International Preliminary Report on Patentability for PCT App. No. PCT/US2011/052525, issued on Apr. 2, 2013.
(Continued)

*Primary Examiner* — William Cheung
(74) *Attorney, Agent, or Firm* — Husch Blackwell LLP

(57) ABSTRACT

A high pressure polymerization process to form an ethylene-based polymer comprises the steps of:
  A. Injecting a first feed comprising a chain transfer agent system (CTA system) and ethylene into a first autoclave reactor zone operating at polymerization conditions to produce a first zone reaction product, the CTA system of the first reactor zone having a transfer activity Z1; and
  B. (1) Transferring at least part of the first zone reaction product to a second reactor zone selected from a second autoclave reactor zone or a tubular reactor zone and operating at polymerization conditions, and, optionally, (2) freshly injecting, a second feed into the second reactor zone to produce a second zone reaction product, with the proviso that at least one of the first reactor zone product and the freshly injected feed comprises a CTA system with a transfer activity of Z2; and
with the proviso that the ratio of Z1:Z2 is greater than 1.

13 Claims, 6 Drawing Sheets

Melt elasticity (ME) as a function of melt index (MI) for Comparative example 1 and Example 2.

Related U.S. Application Data

(60) Provisional application No. 61/388,152, filed on Sep. 30, 2010.

(51) Int. Cl.
 *C08F 10/02* (2006.01)
 *C08F 210/02* (2006.01)
 *C08F 110/02* (2006.01)

(58) Field of Classification Search
 USPC .................................................. 526/64, 348
 See application file for complete search history.

(56) References Cited

U.S. PATENT DOCUMENTS

| | | | |
|---|---|---|---|
| 3,536,693 | A | 10/1970 | Schrader et al. |
| 3,756,996 | A | 9/1973 | Pugh et al. |
| 3,913,698 | A | 10/1975 | Gogins |
| 4,322,027 | A | 3/1982 | Reba |
| 4,340,563 | A | 7/1982 | Appel et al. |
| 4,663,220 | A | 5/1987 | Wisneski et al. |
| 4,668,566 | A | 5/1987 | Braun |
| 4,988,781 | A | 1/1991 | McKinney et al. |
| 5,100,978 | A | 3/1992 | Hasenbein et al. |
| 5,306,791 | A | 4/1994 | Muehlenbernd et al. |
| 5,911,940 | A | 6/1999 | Walton et al. |
| 6,407,191 | B1 * | 6/2002 | Mezquita ............ C08F 10/02 524/272 |

FOREIGN PATENT DOCUMENTS

| | | |
|---|---|---|
| GB | 1578705 | 11/1980 |
| WO | 2005021622 | 3/2005 |
| WO | 2006049783 | 5/2006 |
| WO | 2010042390 | 4/2010 |
| WO | 2011075465 | 6/2011 |
| WO | 2013/059042 A1 | 4/2013 |

OTHER PUBLICATIONS

International Preliminary Report on Patentability for PCT App. No. PCT/US2011/052509, issued on Apr. 2, 2013.
Lee, et al., J. Phys. Chem., 1994, 98, 4055-4060.
Beyer, et al., Cosolvent Studies with the System Ethylene/Poly(ethylene-co-acrylic acid): Effects of Solvent, Density, Polarity, Hydrogen Bonding, and Copolymer Composition, Helvetica Chimica Acta vol. 85, 2002.
Hasch, et al., Fluid Phase Equilibria, 83 (1993), 341-348.
S. Goto et al., Journal of Applied Polymer Science, Applied Polymer Symposium, 36, 21-40, 1981.
G. Mortimer, Journal of Polymer Science, Part A-1, vol. 4, pp. 881-900, 1966.
G. Mortimer, Journal of Polymer Science, Part IV, Additional Study at 1360 atm and 130 C, vol. 8, pp. 1513-1523, 1970.
G. Mortimer, Journal of Polymer Science, Part V, The Effect of Temperature, vol. 8, pp. 15351-15542, 1970.
G. Mortimer, Journal of Polymer Science, Part VII, Very Reactive and Depletable Transfer Agents, vol. 10, pp. 163-168, 1972.
McHugh et al., J. Phys. Chem., 98 (1994), pp. 4055-4060.

\* cited by examiner

*Melt elasticity (ME) as a function of melt index (MI) for Comparative example 1 and Example 2.*

*Melt elasticity (ME) as a function of melt index (MI) for Comparative example 3 and Example 4.*

*Optical properties of blown film samples of Comparative example 1d and Example 2e.*

*Optical properties of blown film samples of Comparative example 3d and Example 4d.*

*Optical properties of blown film samples of Comparative example 5 and Example 6.*

ESTI v. MI relation

POLYMERIZATION PROCESS TO MAKE LOW DENSITY POLYETHYLENE

FIELD OF THE INVENTION

This invention relates to low density polyethylene (LDPE) and polymerization improvements to make LDPE. Notably, the polymerization process involves autoclave reactor(s), preferably operated sequentially with a tubular reactor(s).

BACKGROUND OF THE INVENTION

There are many types of polyethylene made and sold today. One type, in particular, is made by various suppliers and sold in large quantities. This polyethylene is called high pressure, free radical polyethylene (usually called LDPE), and is usually made using a tubular reactor, or an autoclave reactor, or sometimes a combination. Sometimes polymer users blend LDPE with other polymers, such as linear low density polyethylene (LLDPE), to try to modify properties, such as flowability, processability or density. However, there is a need for new LDPE polymers, which can have improved film optics, while maintaining other performance attributes.

Low density polyethylene resins with higher densities (greater than or equal to ($\geq$) 926 kg/m$^3$) are produced at reduced polymerization temperature and elevated pressure, in order to reduce the short chain branching frequency, and consequently to increase product density. Table A shows the kinetic data on the involved reaction steps, as derived by S. Goto et al; *Journal of Applied Polymer Science: Applied Polymer Symposium*, 36, 21-40, 1981 (Title: *Computer model for commercial high pressure polyethylene reactor based on elementary reaction rates obtained experimentally*) (Ref. No. 1). The temperature dependence is given by the activation energy. The higher the activation energy the more a certain reaction step will be promoted by higher temperature or reduced by lower temperatures. For polymer properties the ratio between the rate of a certain reaction step and the propagation rate is of importance.

TABLE A

Rate Constants of Elementary Reaction Rates as Determined by Goto et al (Ref. No. 1)

| Reaction step | Frequency factor | Activation energy, cal/mole | Activation volume, cm$^3$/mole |
|---|---|---|---|
| Propagation | 5.63E+11 | 10,520 | −19.7 |
| SCB | 5.63E12 | 13,030 | −23.5 |

The property temperature dependence is expressed by the A Activation energy, so for SCB frequency in product: $\Delta$ Activation energy=13.03−10.52=2.51 kcal/mole.

When producing high pressure, medium density resins, low temperature conditions should be applied, in order to reduce short chain branching. With the kinetics of Goto et al., it has been found that a "930 kg/m$^3$ density" can be produced by maintaining the average polymerization temperature at 205° C., for a reactor system operating at 2400 bar. This low average temperature can be achieved by lowering the control temperature in each zone of an autoclave process, and by lowering the control peak temperatures in a tubular reactor. The low control/peak temperatures needed for producing medium resins in a tubular reactor, result in significantly reduced heat transfer capability, and consequently, in significantly reduced conversion. For example, an average polymerization temperature of 175° C. for the first polymer fraction of a tubular reactor, where the polymerization is started at 150° C., leads to a sensible heat content of 50° C., needed to dissipate the heat of polymerization, and which, in turn, is equivalent to a conversion of only 4%.

The conversion of an autoclave tube reactor can be maintained at a much higher level, since this system depends to a larger extent on sensible heat content, which allows for a larger part of the polymer to be made at very low temperature conditions. However, an average polymerization temperature of 175° C. for the first polymer fraction of an autoclave reactor leads to a sensible heat content of 135° C., which is equivalent at adiabatic conditions to a conversion of only 10%.

Despite the significant lower conversion level, tubular medium density reactor products are still preferred in many blown film applications for the better optical film properties, due to a narrower molecular weight distribution. The molecular weight distribution of autoclave and autoclave/tube products is broadened by the increased long chain branching (LCB) frequency (due to the higher conversion and polymer concentration level), and the wide residence time distribution in the overall reactor system. In an autoclave system, some polymer molecules will stay, and continue to grow very long through the long chain branching mechanism, while other polymer molecules will stay and grow very short. The overall impact of the wide residence time distribution is broadening of the molecular weight distribution.

As discussed above, there is a need for narrow MWD polyethylene products, with improved optics, and which can be prepared at high conversion levels in autoclave or autoclave/tube reactor systems. These needs and others have been met by the following invention.

SUMMARY OF THE INVENTION

The invention provides a high pressure polymerization process to form an ethylene-based polymer, the process comprising the steps of:
  A. Injecting a first feed comprising a chain transfer agent system (CTA system) and ethylene into a first autoclave reactor zone operating at polymerization conditions to produce a first zone reaction product, the CTA system of the first reactor zone having a transfer activity Z1; and
  B. (1) Transferring at least part of the first zone reaction product to a second reactor zone selected from a second autoclave reactor zone or a tubular reactor zone and operating at polymerization conditions, and, optionally, (2) freshly injecting, a second feed into the second reactor zone to produce a second zone reaction product, with the proviso that at least one of the first reactor zone product and the freshly injected feed comprises a CTA system with a transfer activity of Z2; and
with the proviso that the ratio of Z1:Z2 is greater than 1.

The invention also provides an ethylene-based polymer prepared comprising the following properties: (1) A melt elasticity, in centiNewtons, less than, or equal to, (7.0×(melt index)$^{-0.55}$) and more than, or equal to, (6.0×(melt index)$^{-0.55}$) for a polymer with a melt index greater than 0.45 and less than 0.70; or (2) a melt elasticity, in centiNewtons, less than, or equal to, (5.5×(melt index)$^{-0.83}$) and more than, or equal to, (4.0×(melt index)$^{-0.83}$) for melt index greater than 2.5 and less than 4.0. In one embodiment the inventive ethylene-based polymer is prepared by the inventive process.

DESCRIPTION OF EMBODIMENTS OF THE INVENTION

Overview

Figure 1:
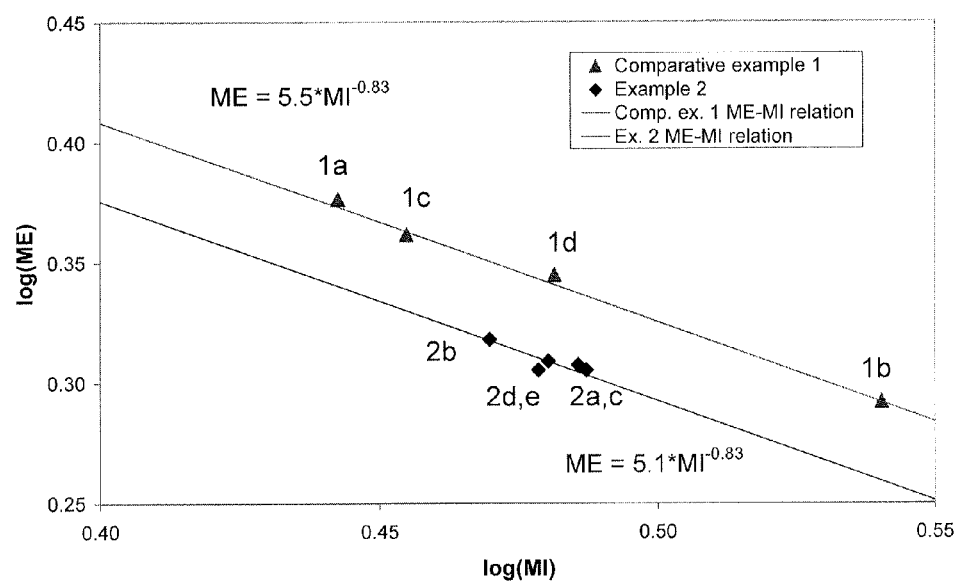
FIG. 1 is a plot of melt elasticity (ME) as a function of melt index (MI) for the samples of Comparative Example 1 and Example 2.
Figure 2:
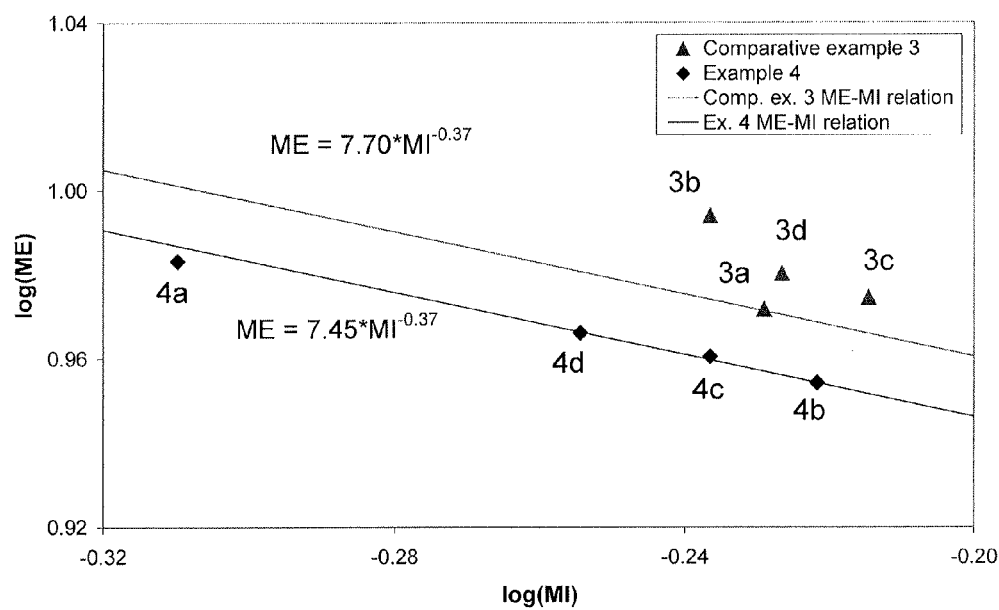
FIG. 2 is a plot of melt elasticity (ME) as a function of melt index (MI) for the samples of Comparative Example 3 and Example 4.

As discussed above the invention provides a high pressure polymerization process to form an ethylene-based polymer, the process comprising the steps of:
  A. Injecting a first feed comprising a chain transfer agent system (CTA system) and ethylene into a first autoclave reactor zone operating at polymerization conditions to produce a first zone reaction product, the CTA system of the having a transfer activity Z1; and
  B. (1) Transferring at least part of the first zone reaction product to a second reactor zone selected from a second autoclave reactor zone or a tubular reactor zone and operating at polymerization conditions, and, optionally, (2) freshly injecting, a second feed into the second reactor zone to produce a second zone reaction product, with the proviso that at least one of the first reactor zone product and the freshly injected feed comprises a CTA system with a transfer activity of Z2; and
with the proviso that the ratio of Z1:Z2 is greater than 1.

In one embodiment, the process further comprises one or more steps of transferring a zone reaction product produced in an (ith−1) reaction zone to an (ith) reaction zone, where $3 \leq i \leq n$, and $n \geq 3$, each zone operating at polymerization conditions, and optionally adding an (ith) feed comprising a CTA system into the (ith) reaction zone, the CTA system of the (ith) reaction zone having a transfer activity of Zi; and with the proviso that the ratio of Z1/Zi is greater than 1.

In one embodiment, a second feed is injected into the second reactor zone, and the second feed comprises a CTA system.

In one embodiment, a second feed is injected into the second reactor zone, and the second feed does not comprise a CTA system.

In one embodiment, a second feed is injected into the second reactor zone, and the second feed comprises ethylene.

In one embodiment, a second feed is injected into the second reactor zone, and the second feed comprises ethylene and a CTA system.

In one embodiment, a second feed is injected into the second reactor zone, and the second feed comprises ethylene but does not comprise a CTA system.

In one embodiment, the second feed of any of the preceding embodiments comprises at least one comonomer.

In one embodiment, the ith feed of any of the preceding embodiments further comprises ethylene.

In one embodiment, the ith feed of any of the preceding claims further comprises at least one comonomer.

In one embodiment, the at least one comonomer of any of the preceding embodiments is injected into one or more of (i) a suction to a hyper compressor, (ii) a hyper compressor discharge, and (iii) one or more autoclave or tubular reactor zones.

In one embodiment, the at least one comonomer of any of the preceding embodiments is of acrylate, silane, vinyl acetate and carbon monoxide.

In one embodiment of the process of any of the preceding embodiments, steps (B)(1) and (B)(2) are conducted simultaneously.

In one embodiment of the process of any of the preceding embodiments, steps (B)(1) and (B)(2) are conducted at different times.

In one embodiment of the process of any of the preceding embodiments, at least part of the first zone reaction product is transferred to a second autoclave reactor zone.

In one embodiment of the process of any of the preceding embodiments, the second autoclave reactor zone is adjacent to the first autoclave reactor zone.

In one embodiment of the process of any of the preceding embodiments, the second autoclave reactor zone is separated from the first autoclave reactor zone by one or more reactor zones.

In one embodiment of the process of any of the preceding embodiments, at least part of the first zone reaction product is transferred to a tubular reactor zone.

In one embodiment of the process of any of the preceding embodiments, the tubular reactor zone is adjacent to the first autoclave reactor zone.

In one embodiment of the process of any of the preceding embodiments, the tubular reactor zone is separated from the first autoclave reactor zone by one or more reactor zones.

In one embodiment of the process of any of the preceding embodiments, each feed to each reactor zone contains the same CTA system. In a further embodiment the CTA system of each feed contains a single CTA.

In one embodiment of the process of any of the preceding embodiments, at least one of the feeds to at least one of the reactor zones contains a CTA that is different from at least one of the CTAs to the other reactor zones.

In one embodiment of the process of any of the preceding embodiments, each CTA is independently one of an olefin, an aldehyde, a ketone, an alcohol, a saturated hydrocarbon, an ether, a thiol, a phosphine, an amino, an amine, an amide, an ester, and an isocyanate.

In one embodiment of the process of any of the preceding embodiments, each CTA is independently methyl ethyl ketone (MEK), propionaldehyde, butene-1, acetone, isopropanol or propylene.

In one embodiment of the process of any of the preceding embodiments, at least one CTA has a chain transfer constant Cs greater than 0.003.

In one embodiment of the process of any of the preceding embodiments, all autoclave zones are located in the same autoclave reactor.

In one embodiment of the process of any of the preceding embodiments, the autoclave zones are located in two or more different autoclave reactors.

In one embodiment of the process of any of the preceding embodiments, the autoclave zones are of about the same size.

In one embodiment of the process of any of the preceding embodiments, two or more of the autoclave zones are of different sizes.

In one embodiment of the process of any of the preceding embodiments, the polymerization conditions in each reactor zone are operated at the same temperature and same pressure.

In one embodiment of the process of any of the preceding embodiments, at least one polymerization condition in at least one reactor zone is different from the other polymerization conditions.

In one embodiment of the process of any of the preceding embodiments, each of the polymerization conditions in the reactor zones, independently, comprises a temperature greater than, or equal to, 100° C., and a pressure greater than, or equal to, 100 MPa.

In one embodiment of the process of any of the preceding embodiments, each of the polymerization conditions in the reactor zones, independently, comprises a temperature less than 400° C., and a pressure less than 500 MPa.

In one embodiment of the process of any of the preceding embodiments, the ratio Z1/Z2 and each ratio Z1/Zi are greater than 1.03.

In one embodiment of the process of any of the preceding embodiments, the ratio Z1/Z2 and each ratio Z1/Zi are greater than 1.10.

In one embodiment of the process of any of the preceding embodiments, the ratio Z1/Z2 and each ratio Z1/Zi are less than 10.

In one embodiment an inventive process may comprise a combination of two or more embodiments as described herein.

In one embodiment the invention is an ethylene-based polymer made by the process of the any of the preceding embodiments.

In one embodiment, the ethylene-based polymer is a polyethylene homopolymer.

In one embodiment, the ethylene-based polymer is an ethylene-based interpolymer.

In one embodiment, the ethylene-based polymer is an ethylene-based copolymer.

In one embodiment, the invention is an ethylene-based polymer having (A) a melt elasticity, in centiNewtons, less than, or equal to, $(7.0 \times (\text{melt index})^{-0.55})$ and more than $(6.0 \times (\text{melt index})^{-0.55})$ for a polymer with a melt index greater than 0.45 and less than 0.70; or (B) a melt elasticity, in centiNewtons, less than, or equal to, $(5.5 \times (\text{melt index})^{-0.83})$ and more than $(4.0 \times (\text{melt index})^{-0.83})$ for melt index greater than 2.5 and less than 4.0.

In one embodiment, the ethylene-based polymer of any of the preceding polymer embodiments has a melt elasticity, in centiNewtons, less than, or equal to, $(6.8 \times (\text{melt index})^{-0.55})$ for a polymer with a melt index greater than 0.45 and less than 0.70; or (2) a melt elasticity, in centiNewtons, less than, or equal to, $(5.2 \times (\text{melt index})^{-0.83})$ for melt index greater than 2.5 and less than 4.0.

In one embodiment, the ethylene-based polymer of any of the preceding polymer embodiments has a density from 0.926 to 0.94 g/cm$^3$, and a melt index of 0.2 to 5 g/10 min.

In one embodiment, the ethylene-based polymer of any of the preceding polymer embodiments is a polyethylene homopolymer.

In one embodiment, the ethylene-based polymer of any of the preceding polymer embodiments is an ethylene-based interpolymer.

In one embodiment, the ethylene-based polymer of any of the preceding polymer embodiments is an ethylene-based copolymer.

In one embodiment, an inventive polymer may comprise a combination of two or more embodiments as described herein.

In one embodiment, the invention is a composition comprising the ethylene-based polymer of any of preceding polymer embodiments.

In one embodiment, the composition further comprises another ethylene-based polymer.

In one embodiment, an inventive composition may comprise the combination of two or more embodiments as described herein.

In one embodiment, the invention is an article comprising at least one component formed from a composition of any of the preceding composition embodiments.

In one embodiment, an inventive article may comprise the combination of two or more embodiments as described herein.

In one embodiment, the invention is a film comprising at least one component formed from the composition of any of the preceding composition embodiments.

In one embodiment, an inventive film may comprise the combination of two or more embodiments as described herein.

Polymerizations

For a high pressure, free radical initiated polymerization process, two basic types of reactors are known. In the first type, an agitated autoclave vessel having one or more reaction zones is used: the autoclave reactor. In the second type, a jacketed tube is used as reactor, which tube has one or more reaction zones: the tubular reactor. The high pressure process of the present invention to produce polyethylene homo or copolymers having the advantageous properties as found in accordance with the invention, can be carried out in an autoclave reactor having at least 2 reaction zones or in a combination of an autoclave and a tubular reactor.

The temperature in each autoclave and tubular reactor zone of the process is typically from 100 to 400, more typically from 150 to 350 and even more typically from 160 to 320, ° C. The pressure in each autoclave and tubular reactor zone of the process is typically from 100 to 400, more typically from 120 to 360 and even more typically from 150 to 320, MPa. The high pressure values used in the process of the invention have a direct effect on the amount of chain transfer agent, for example MEK or propionaldehyde, incorporated in the polymer. The higher the reaction pressure is, the more chain transfer agent derived units are incorporated in the product.

In one embodiment of the process of the invention, a combination of an autoclave comprising at least two reaction zones and a conventional tubular reactor having at least one reaction zone is used. In a further embodiment, such a conventional tubular reactor is cooled by an external water jacket and has at least one injection point for initiator and/or monomer. Suitable, but not limiting, reactor lengths can be between 500 and 1500 meters. The autoclave reactor normally has several injection points for initiator and/or monomer. The particular reactor combination used allows conversion rates of above 20 percent, which is significantly higher than the conversion rates obtained for standard tube reactors, which allow conversion rates of about 16-18 percent, expressed as ethylene conversion, for the production of low density type of polymers.

Examples of suitable reactor systems are described in U.S. Pat. Nos. 3,913,698 and 6,407,191.

Monomer and Comonomers

The term ethylene copolymer as used in the present description and the claims refers to polymers of ethylene and one or more comonomers. Suitable comonomers to be used in the ethylene polymers of the present invention include, but are not limited to, ethylenically unsaturated monomers and especially $C_{3-20}$ alpha.-olefins, acetylenic compounds, conjugated or nonconjugated dienes, polyenes, carbon monoxide, vinyl acetate, and $C_{2-6}$ alkyl acrylates.

Initiators

The process of the present invention is a free radical polymerization process. The type of free radical initiator to be used in the present process is not critical. Free radical initiators that are generally used for such processes are oxygen, which is usable in tubular reactors in conventional amounts of between 0.0001 and 0.005 weight percent (wt %) drawn to the weight of polymerizable monomer, and organic peroxides. Typical and preferred initiators are the organic peroxides such as peresters, perketals, peroxy ketones and percarbonates, di-tert-butyl peroxide, cumyl perneodecanoate, and tert-amyl perpivalate. Other suitable initiators include azodicarboxylic esters, azodicarboxylic dinitriles and 1,1,2,2-tetramethylethane derivatives. These organic peroxy initiators are used in conventional amounts of between 0.005 and 0.2 wt % drawn to the weight of polymerizable monomers.

Chain Transfer Agents (CTA)

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the weight average molecular weight, $M_w$. The melt flow index (MFI or $I_2$) of a polymer, which is related to $M_w$, is controlled in the same way.

The chain transfer agents used in the process of this invention include, but are not limited to, aliphatic and olefinic hydrocarbons, such as pentane, hexane, cyclohexane, propene, pentene or hexene; ketones such as acetone, diethyl ketone or diamyl ketone; aldehydes such as formaldehyde or acetaldehyde; and saturated aliphatic aldehyde alcohols such as methanol, ethanol, propanol or butanol. Preferred chain transfer agents are those with a chain transfer constant (Cs) of at least 0.003 (e.g., propane, isobutane), more preferably at least 0.01 (e.g., propylene, isopropanol, acetone, 1-butene), and even more preferably at least 0.05 (e.g., methyl ethyl ketone (MEK), propionaldehyde, tert-butanethiol). The Cs is calculated as described by Mortimer at 130° C. and 1360 atmospheres (Ref. No. 1-3). The top Cs value typically does not exceed 25, more typically it does not exceed 21.

In one embodiment, the amount of chain transfer agent used in the process of the present invention is from 0.03 to 2.0 percent by weight, preferably from 0.5 to 1.5 percent by weight based on the amount of monomer introduced in the reactor system.

The manner and timing of the introduction of the CTA into the process of the invention can vary widely as long as the CTA and/or ethylene is freshly injected into at least two reaction zones. Typically the CTA is fed to the first reaction zone along with ethylene and other reaction components, e.g., comonomers, initiator, additives, etc., and make-up CTA, i.e., CTA replacement for the CTA consumed in the first reactor zone, is fed to a down d, stream ($2^{nd}$, $3^{rd}$, $4^{th}$, etc) reaction zone. The first reaction zone is an autoclave.

In one embodiment, make-up CTA is fed together with fresh ethylene through direct injection and/or along with the injected peroxide solution.

In one embodiment, additional (fresh) ethylene without CTA is fed as a make up flow for ethylene consumed in the first reaction zone either to the first autoclave reaction zone and/or to one or more down stream reaction zones.

In one embodiment, the make-up CTA is a CTA with a Cs higher than the Cs of the CTA fed to the first reaction zone. This can increase the conversion level in reactor system.

In one embodiment, the CTA comprises a monomeric group, like propylene, butene-1, etc. The monomeric group enhances reactor conversion (it increases the consumption of comonomer).

In one embodiment, the CTA and/or operating conditions in the recycle sections are selected such that the CTA will condense and/or separate from the polymer product resulting in less CTA recycled back to the reactor inlet.

In one embodiment, CTA is purged from the reactor system in a downstream reaction zone.

In one embodiment, the reactor system comprises two autoclave reaction zones followed by two reaction tubular zones, and ethylene monomer and CTA are fed to both autoclave reaction zones but not to either tubular reaction zone.

In one embodiment, the reactor system comprises two autoclave reaction zones followed by two reaction tubular zones, and ethylene monomer and CTA are fed to both autoclave reaction zones but not to either tubular reaction zone, but initiator is fed to one or both tubular reaction zones.

Polymers

The ethylene-based polymers made according to the process of this invention can vary from film grade, with a very narrow molecular weight distribution (MWD), to coating type resins having a much broader MWD, by enhancing the production in the tube or in the autoclave where either a minor or a large degree of back mixing is needed. By polymerizing ethylene, and optionally comonomers, in an autoclave reactor, one will get a polymer product having a broad molecular weight distribution, while the polymerization in a tubular reactor will give a polymer product having a narrow molecular weight distribution Surprisingly, however, by using combinations of tubular and autoclave reactors in series, one can, dependent on the reaction conditions and percentages of monomer polymerized in the reactors, design polymer products with very narrow molecular weight distributions. In this way the molecular weight distribution of polyethylene homo or copolymers can be manipulated with more flexibility than in a conventional autoclave reactor or in a conventional tubular reactor, while maintaining a high polymer density.

The ethylene-based polymers made according to this invention have the benefits of conversion as mentioned above. This distinguishes them from other ways of making similar ethylene polymers, being in a tubular process. In one aspect the polymer of this invention has a narrower MWD than other polymers made in similar reactors that do not use the split CTA concept (Z1/Zi=1). This exemplified and quantified with the melt elasticity-melt index balance, which is a sensitive method to show these differences as shown by the examples and comparative examples. It is also exemplified by the improvement in film optics associated narrow MWD.

In one embodiment, the ethylene-based polymers of this invention have a typical density from 0.910 to 0.940, more typically from 0.915 to 0.940 and even more typically from 0.926 to 0.940, grams per cubic centimeter (g/cc or g/cm$^3$). In one embodiment, the ethylene-based polymers of this invention have a typical melt index ($I_2$) from 0.1 to 100, more typically from 0.12 to 20 and even more typically from 0.15 to 5, grams per 10 minutes (g/10 min) at 190° C./2.16 kg. In one embodiment, the ethylene-based polymers of this invention have a typical Mw/Mn from 4 to 20, or from 5 to 10, or from 5 to 6. In one embodiment, the ethylene-based polymers of this invention have a melt elasticity from 1 to 10, typically from 2-8, centiNewtons (cN). In one embodiment, the ethylene-based polymers of this invention have two or more of these density, melt index, Mw/Mn and melt elasticity properties.

Ethylene-based polymers include LDPE homopolymer (preferred), and high pressure copolymers include ethylene/vinyl acetate (EVA), ethylene ethyl acrylate (EEA), and ethylene butyl acrylate (EBA). Product applications include collation shrink film, label film, blown and cast film for both medium density (≥0.926 g/cm$^3$) and standard density (<0.926 g/cm$^3$) LDPE.

Blends

The inventive polymers can be blended with one or more other polymers such as, but not limited to, linear low density polyethylene (LLDPE), copolymers of ethylene with one or more alpha-olefins such as, but not limited to, propylene, butene-1, pentene-1,4-methylpentene-1, pentene-1, hexene-1 and octene-1; high density polyethylene (HDPE) such as HDPE grades HD 940-970 available from The Dow Chemical Company. The amount of inventive polymer in the blend can vary widely, but typically it is from 10 to 90, from 50 to 90, or from 70 to 90, wt %, based on the weight of the polymers in the blend. If the inventive polymer has a relatively narrow MWD (e.g., below 6) then the inventive polymer typically constitutes a majority of the blend, i.e., it is LDPE-rich, and contains 50 or more wt % of the inventive polymer, based on the weight of the polymers in the blend. If the inventive polymer has a relatively broad MWD (e.g., 6 or above), then the inventive polymer typically constitutes a minority of the blend, i.e., it is LDPE-poor, and contains less than 50 wt % of the inventive polymer, based on the weight of the polymers in the blend. LDPE-rich blends blended typically provide good optics, and/or are useful in the preparation of laminations. LDPE-poor blends typically exhibit good processability, and/or are useful in such applications as film blowing and extrusion coating.

Additives

One or more additives may be added to a composition comprising an inventive polymer. Suitable additives include stabilizers, fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils. In addition, other natural and synthetic polymers, including other polymers that are made according to the inventive process, and polymers made by other processes, may be added to an inventive composition.

Uses

The polymer of this invention may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or nonwoven fabrics. Thermoplastic compositions comprising the ethylenic polymer include blends with other natural or synthetic materials, polymers, additives, reinforcing agents, ignition resistant additives, antioxidants, stabilizers, colorants, extenders, crosslinkers, blowing agents, and plasticizers.

The inventive polymer may be used in producing fibers for other applications. Fibers that may be prepared from the polymer of this invention, or a blend comprising a polymer of this invention, include staple fibers, tow, multi-component, sheath/core, twisted, and monofilament. Suitable fiber forming processes include spin-bonded, melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel-spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The inventive polymer may be used in a variety of films, including but not limited to, clarity shrink films, collation shrink films, cast stretch films, silage films, stretch hood, sealants, and diaper backsheets. Films made with the inventive polymer often exhibit desirable optics, e.g., a haze value of less 15, 12 or 10, percent and/or a gloss value greater than 46, 52 or 56%. In one embodiment a film made from the polymer of this invention exhibits both a haze value of less 15, 12 or 10, percent and/or a gloss value greater than 46, 52 or 56%.

The inventive polymer is also useful in other direct end-use applications. The inventive polymer is useful for wire and cable coating operations, in sheet extrusion for vacuum forming operations, and forming molded articles, including the use of injection molding, blow molding process, or rotomolding processes. Compositions comprising the inventive polymer can also be formed into fabricated articles using conventional polyolefin processing techniques.

Other suitable applications for the inventive polymer include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

Further treatment of the polymer of this invention may be performed for application to other end uses. For example, dispersions (both aqueous and non-aqueous) can also be formed using the present polymers or formulations comprising the same. Frothed foams comprising the inventive polymer can also be formed, as disclosed in PCT Publication No. 2005/021622 (Strandeburg, et al.). The inventive polymer may also be crosslinked by any known means, such as the use of peroxide, electron beam, silane, azide, or other cross-linking technique. The inventive polymer can also be chemically modified, such as by grafting (for example by use of maleic anhydride (MAH), silanes, or other grafting agent), halogenation, amination, sulfonation, or other chemical modification.

In one embodiment the polymers of this invention and those of PCT/US10/60244 are used in the construction of release liners for use with pressure sensitive adhesive (PSA) label production. Each advanced design of the resins made by these inventions fulfill film or extrusion coating performance in combination with higher temperature resistance that is a result of higher product density. The medium density polymers disclosed in PCT/US10/60244 are especially suitable for extrusion coating and release liners. The polymers of the present invention are especially suitable for mono- and multi-layer films.

In some embodiments, release liners are prepared by a two-step process. The first step is coating paper with a polyolefin resin, e.g., a polyethylene such as LDPE. The second step is coating and drying the polyolefin-coated paper with a silicone layer. The polyolefin resin thus has to comply with several requirements, i.e., it must exhibit extrusion coating process stability, paper adhesion, and temperature resistance in the drying oven for siliconization. Polymers with an elevated density (0.926 to 0.935 $g/cm^3$) show improved temperature resistance for the secondary siliconization drying step in an extrusion coating application. In addition, the LDPE made by the process of these inventions have the cleanliness required for high platinum catalyst containing silicone systems.

DEFINITIONS

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, molecular weight, reagent amounts and process conditions.

The term "composition," as here used means a combination of two or more materials. With the respective to the inventive polymer, a composition is the inventive polymer in combination with at least one other material, e.g., an additive, filler, another polymer, catalyst, etc.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "reactor zone," refers to a section of a reactor where a free radical polymerization reaction takes place by injecting an initiator system, which is able to decompose to radicals at the conditions within the zone. A reactor zone can be a separate reactor unit or a part of a larger reactor unit. In a tubular plug flow reactor unit, each zone begins where fresh initiator is injected. In an autoclave reactor unit, zones are formed by a separation device, e.g., a baffle, preventing back mixing. Each reactor zone has its own initiator feed, while feeds of ethylene, comonomer, chain transfer agent and other components can be transferred from a previous reaction zone, and/or freshly injected (mixed or as separate components).

The term "zone reaction product" refers to the ethylene-based polymer made under high-pressure conditions (e.g., a reaction pressure greater than 100 MPa) through a free radical polymerization mechanism. Due to intermolecular hydrogen transfer, existing dead polymer molecules can be reinitiated, resulting in the formation of long chain branches (LCB) on the original (linear) polymer backbone. In a reactor zone, new polymer molecules are initiated, and a part of the polymer molecules formed will be grafted on existing polymer molecules to form long chain branches. Zone reaction product is defined as the polymer present in the end of the reactor zone.

The term "polymerization conditions" refers to process parameters under which the initiator entering the reactor zone will at least partly decompose into radicals, initiating the polymerization. Polymerization conditions include, for example, pressure, temperature, concentrations of reagents and polymer, residence time and distribution, influencing the molecular weight distribution and polymer structure. The influence of polymerization conditions on the polymer product is well described and modeled in S. Goto et al, Ref No. 1.

The term "CTA system" includes a single CTA or a mixture of CTAs. A CTA system includes a component able to transfer a hydrogen atom to a growing polymer molecule containing a radical by which the radical is transferred to the CTA molecule, which can then initiate the start of a new polymer chain. CTA is also known as telogen or telomer. In a preferred embodiment of the invention, each CTA system comprises a single CTA.

The term "suction to a hyper compressor" refers to the final compressor prior to the reactor that brings one or more feed flows to reactor pressure from a lower pressure. The suction to a hyper compressor is the inlet configuration of this compressor.

The term "hyper compressor discharge" refers to the outlet configuration of the hyper compressor.

Test Methods

Polymer Testing Methods

Density:

Samples for density measurement are prepared according to ASTM D 1928. Samples are pressed at 190° C. and 30,000 psi for 3 minutes, and then at (21° C.) and 207 MPa for 1 minute. Measurements are made within one hour of sample pressing using ASTM D792, Method B.

Melt Index:

Melt index, or $I_2$, (grams/10 minutes) is measured in accordance with ASTM D 1238, Condition 190° C./2.16 kg. $I_{10}$ is measured with ASTM D 1238, Condition 190° C./10 kg.

Melt Elasticity:

Melt elasticity is measured using a DMELT system. The DMELT system is comprised of a commercial plastometer, a digital balance incorporating a custom weighted sample pan with a mounted tension roller, and a pull roller controlled by stepper motor. The plastomer produces a molten polymer strand that is guided around the tension roller on the balance pan and up an over another pulley before being wound onto the pull roller. Pull roller speed is precisely controlled by computer. Melt elasticity is determined as the force on the tension roller at a specified draw down ratio (haul off speed/die exit speed). The technology is applicable to thermoplastic and/or thermosetting plastics.

For the melt elasticity measurement a molten polymer strand is extruded from a standard plastometer (MP600 Extrusion Plastometer (Melt Indexer) System Installation & Operation Manual (#020011560), Tinius Olsen, 1065 Easton Road, Horsham, Pa. 19044-8009; Ref. No. 13.6) barrel at a constant temperature (190° C.) through a standard ASTM D1238 MFR die (orifice height (8.000±0.025 mm) and diameter (2.0955±0.005 mm)) using a weighted piston. The extrudate is pulled through a series of free spinning rollers onto a roller driven by a stepper motor (Stepper Motor and Controller Operating Manual, Oriental Motor USA Corporation, 2570 W. 237$^{th}$ Street, Torrance, Calif. 90505; Ref. No. 13.7) which is ramped over a velocity range during the analysis. The force of the polymer strand pulling up on the balance (Excellence Plus XP Precision Balance Operating Instructions, Mettler Toledo, 1900 Polaris Parkway, Columbus, Ohio 43240; Ref. No. 13.8) platform mounted tension roller is recorded by the integrated control computer. From a linear regression of the acquired force data, the final reported value is determined based on a constant velocity ratio (33.2) or strain (Ln[Speed ratio]=3.5) of the polymer strand speed versus the die exit speed. Analysis results are reported in units of centiNewtons (cN).

Triple Detector Gel Permeation Chromatography (TDGPC):

High temperature 3Det-GPC analysis is performed on an Alliance GPCV2000 instrument (Waters Corp.) set at 145° C. The flow rate for the GPC is 1 mL/min. The injection volume is 218.5 μL. The column set consists of four Mixed-A columns (20-μm particles; 7.5×300 mm; Polymer Laboratories Ltd).

Detection is achieved by using an IR4 detector from Polymer ChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 and polydispersity of 1.11. A specific refractive index increment (dn/dc) of −0.104 mL/mg, for polyethylene in TCB, is used.

The conventional GPC calibration is done with 20 narrow PS standards (Polymer Laboratories Ltd.) with molecular weights in the range 580-7,500,000 g/mol. The polystyrene standard peak molecular weights are converted to polyethylene molecular weights using $$M_{polyethylene}=A\times(M_{polystyrene})^B$$

with A≈0.39, B=1. The value of A is determined by using HDPE Dow 53494-38-4, a linear polyethylene homopolymer with Mw of 115,000 g/mol. The HDPE reference material is also used to calibrate the IR detector and viscometer by assuming 100% mass recovery and an intrinsic viscosity of 1.873 dL/g.

Distilled "Baker Analyzed"-grade 1,2,4-trichlorobenzene (J. T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiments. HDPE SRM 1483 is obtained from the U.S. National Institute of Standards and Technology (Gaithersburg, Md., USA).

LDPE solutions are prepared by dissolving the samples under gentle stirring for three hours at 160° C. The PS standards are dissolved under the same conditions for 30 minutes. The sample concentration for the 3Det-GPC experiments is 1.5 mg/mL and the polystyrene concentrations 0.2 mg/mL.

A MALS detector measures the scattered signal from polymers or particles in a sample under different scattering angles θ. The basic light scattering equation (from M.

Andersson, B. Wittgren, K.-G. Wahlund, Anal. Chem. 75, 4279 (2003)) can be written as $$\sqrt{\frac{Kc}{R_\theta}} = \sqrt{\frac{1}{M} + \frac{16\pi^2}{3\lambda^2}\frac{1}{M}R_g^2\sin^2\left(\frac{\theta}{2}\right)} \quad (2)$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and $\lambda$ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from initial slope of the curve. The Zimm and Berry methods are used for all data. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector. Data processing is done with in house-written Microsoft EXCEL macros.

The calculated molecular weights, and molecular weight distributions (?) are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Dynamic Mechanical Spectroscopy (DMS):

Resin is compression-molded into a 2 mm thick×70 mm×100 mm rectangular plaque at 150° C. for 3 minutes at 1 MPa pressure, followed by 1 minute at 15 MPa pressure. The sample is then taken out of the press and quench cooled to room temperature.

Melt rheology, constant temperature frequency sweeps, are performed using a TA Instruments "Advanced Rheometric Expansion System (ARES)," equipped with 25 mm parallel plates, under a nitrogen purge. The sample is placed on the plate and allowed to melt for five minutes at 190° C. The plates are then closed to 2 mm, the sample trimmed, and then the test is started. The method has an additional five minute delay built in, to allow for temperature equilibrium. The experiments are performed at 190° C. over a frequency range of 0.1 to 100 rad/s. The strain amplitude is constant at 10%. The stress response is analyzed in terms of amplitude and phase, from which the storage modulus (G'), loss modulus (G"), dynamic viscosity $\eta^*$, and tan ($\delta$) are calculated.

Film Testing Conditions

Haze:

Samples measured for overall haze are sampled and prepared according to ASTM D 1003. Films were prepared as described in the experimental section below.

45° Gloss:

45° gloss is measured by ASTM D-2457. Films were prepared as described in the experimental section below.

EXPERIMENTAL

Calculations for Z1, Z2 and Zi

The "reactor zone molar concentration of a CTA j in a reactor zone i ([CTA]ji)" is defined as the "total molar amount of that CTA freshly injected to reactor zones 1 to i" divided by the "total molar amount of ethylene freshly injected to reactor zones 1 to i." This relationship is shown below in Equation A.

$$[CTA]_{j_i} = \frac{\sum_{k=1}^{i} n_{CTA,j_k}}{\sum_{k=1}^{i} n_{eth_k}} \quad [\text{Eqn. A}]$$

In Equation A, j≥1, $n_{CTA,j_i}$ is the "amount of moles of the jth CTA freshly injected to the ith reactor zone," and $n_{eth_i}$ is the "amount of moles of ethylene freshly injected to the ith reactor zone."

The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm) and a reference temperature (130° C.). This relationship is shown below in Equation B, where $n_{comp}i$ is the total number of CTAs in reactor zone i.

$$Z_i = \sum_{j_i=1}^{n_{comp,i}} [CTA]_{j_i} \cdot C_{s,j} \quad (\text{Eqn. B})$$

Thus, the ratio Z1/Zi is shown below in Equation C.

$$\frac{Z_1}{Z_i} = \frac{\sum_{j_i=1}^{n_{comp,1}} [CTA]_{j_i} \cdot C_{s,j}}{\sum_{j_i=1}^{n_{comp,i}} [CTA]_{j_i} \cdot C_{s,j}} \quad (\text{Eqn. C})$$

The chain transfer constant (Cs) values for some chain transfer agents are shown below in Table B, showing chain transfer constants (Cs) derived by Mortimer at 130° C. and 1360 atm for example chain transfer agents.

TABLE B

| | Cs-Values as Measured by Mortimer at 130° C. and 1360 atm in References 3 and 4 |
|---|---|
| CTA | Cs at 130° C. and 1360 atm |
| propane | 0.0030 |
| iso-butane | 0.0072 |
| propylene | 0.0122 |
| iso-propanol | 0.0144 |
| acetone | 0.0168 |
| 1-butene | 0.047 |
| methyl ethyl ketone | 0.060 |
| propionaldehyde | 0.33 |
| tert-butanethiol | 15 |

Ref. No. 2. G. Mortimer; Journal of Polymer Science: Part A-1; Chain transfer in ethylene polymerization; vol 4, p 881-900 (1966)

Ref. No. 3. G. Mortimer; Journal of Polymer Science: Part A-1; Chain transfer in ethylene polymerization. Part Iv. Additional study at 1360 atm and 130° C.; vol 8, p 1513-1523 (1970)

Ref. No. 4. G. Mortimer; Journal of Polymer Science: Part A-1; Chain transfer in ethylene polymerization. Part VII. Very reactive and depletable transfer agents; vol 10, p 163-168 (1972)

When only one CTA is used in the total reactor system, Equations B and C simplify to Equations D and E, respectively.

$$Z_i = [CTA]_i \cdot C_s \quad \text{(Eqn. D)}$$

$$\frac{Z_1}{Z_i} = \frac{[CTA]_1 \cdot C_s}{[CTA]_i \cdot C_s} = \frac{[CTA]_1}{[CTA]_i} \quad \text{(Eqn. E)}$$

For five out of the six polymerizations (three inventive, two comparative) discussed below, only one CTA was used. For one of the comparative polymerizations, two CTAs were used as the CTA system. Four reactor zones are used configured as A A T T. Reactor zone 1 is A, reactor zone 2 is A, reactor zone 3 is T, reactor zone 4 is T. CTA is injected into zones 1 and 2, only initiator is injected into zones 3 and 4, however typically some CTA is carried over into zones 3 and 4 from zones 1 and 2. No CTA is added to reactor zones 3 and 4.

Only one CTA implies that Cs drops out of equations, and thus, Equation E is used for most examples, as shown below.

$$\frac{Z_1}{Z_2} = \frac{[CTA]_1 \cdot C_s}{[CTA]_2 \cdot C_s} = \frac{[CTA]_1}{[CTA]_2} = \frac{\sum_{k=1}^{1} n_{CTA_k}}{\sum_{k=1}^{1} n_{eth_k}} \cdot \frac{\sum_{k=1}^{2} n_{eth_k}}{\sum_{k=1}^{2} n_{CTA_k}}$$

$$= \frac{\sum_{k=1}^{2} n_{eth_k}}{\sum_{k=1}^{2} n_{eth_k}} \cdot \frac{\sum_{k=1}^{1} n_{CTA_k}}{\sum_{k=1}^{2} n_{CTA_k}} = \frac{n_{eth_1} + n_{eth_2}}{n_{eth_1}} \cdot \frac{n_{CTA_1}}{n_{CTA_1} + n_{CTA_2}}$$

In addition, the tubular part of the AC/tube reactor system (which is the system used to generate all examples) can be considered as reactor zones 3 and 4, where both zones do not receive any additional freshly injected ethylene or CTA. This means that Equation E becomes as shown below. So Z1/Z4=Z1/Z3=Z1/Z2.

$$\frac{Z_1}{Z_i} = \frac{[CTA]_1 \cdot C_s}{[CTA]_i \cdot C_s} = \frac{[CTA]_1}{[CTA]_i} = \frac{\sum_{k=1}^{1} n_{CTA_k}}{\sum_{k=1}^{1} n_{eth_k}} \cdot \frac{\sum_{k=1}^{i} n_{eth_k}}{\sum_{k=1}^{i} n_{CTA_k}}$$

$$= \frac{\sum_{k=1}^{i} n_{eth_k}}{\sum_{k=1}^{1} n_{eth_k}} \cdot \frac{\sum_{k=1}^{1} n_{CTA_k}}{\sum_{k=1}^{i} n_{CTA_k}} = \frac{\sum_{k=1}^{2} n_{eth_k}}{\sum_{k=1}^{1} n_{eth_k}} \cdot \frac{\sum_{k=1}^{1} n_{CTA_k}}{\sum_{k=1}^{2} n_{CTA_k}} = \frac{Z_1}{Z_2}, i \geq 3$$

In addition, for all examples: $n_{eth_1} = n_{eth_2}$, and thus, the relationship is further simplified as shown below.

$$\frac{Z_1}{Z_2} = \frac{n_{eth_1} + n_{eth_2}}{n_{eth_1}} \cdot \frac{n_{CTA_1}}{n_{CTA_1} + n_{CTA_2}} =$$

$$\frac{n_{eth_1} + n_{eth_1}}{n_{eth_1}} \cdot \frac{n_{CTA_1}}{n_{CTA_1} + n_{CTA_2}} = 2 \cdot \frac{n_{CTA_1}}{n_{CTA_1} + n_{CTA_2}}$$

Polymerization and Polymers

Comparative Example 1

Make-Up MEK (CTA) is Equally Divided Over Both Autoclave Reaction Zones (1 and 2)

Reactor pressure: 2440 bar
Autoclave (AC) residence time: 55 seconds
Tubular residence time: 80 seconds Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.

Temperature Conditions:
Autoclave top-zone (50% ethylene): Inlet: 39° C.; control 171° C.
Autoclave bottom-zone (50% ethylene): Inlet: 35° C.; control 171° C.
Tube $1^{st}$ zone control: 271° C.
Tube $2^{nd}$ zone control: 271° C.

Methyl ethyl ketone (MEK) is used as the chain transfer agent. The recycled MEK (after partial conversion in the reactor, partial condensation in the low pressure recycle section and/or partial purging) is equally divided over both reactor ethylene feed streams and both AC reaction zones. The fresh make-up MEK (to maintain MEK concentration in order to control/vary MI) is equally divided over both AC reaction zones.

For this polymerization, for the average sample $$\frac{Z_1}{Z_2} = 2 \cdot \frac{8204}{8204 + 8204} = 1$$

Product Sampling Samples are taken to measure the rheology results of the polymer, and the average sample (1d) is taken for blown film evaluation. Results are reported in Table 1.

TABLE 1

Comparative Example 1a-1d Rheology Results and MEK Concentrations

| Sample* | Melt-index dg/min | Melt-elasticity cN | MEK (AC) feed Zone 1 Molar ppm | MEK (AC) feed Zone 2 Molar ppm | Z1/Z2 | ESTI |
|---|---|---|---|---|---|---|
| 1a | 2.77 | 2.38 | 8410 | 8410 | 1.00 | 0.925 |
| 1b | 3.47 | 1.96 | 8220 | 8220 | 1.00 | 0.934 |
| 1c | 2.85 | 2.30 | 7981 | 7981 | 1.00 | 0.934 |
| 1d | 3.03 | 2.21 | 8204 | 8204 | 1.00 | 0.931 |

*Samples 1a-1c are actual final polymerization samples. Sample 1d represents the average of samples 1a-1c.

Inventive Example 2

Make-Up MEK (CTA) is Sent to the Autoclave Top Reaction Zone

Reactor pressure: 2440 bar
Autoclave residence time: 55 seconds
Tubular residence time: 80 seconds
Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.
Temperature Conditions:
Autoclave top-zone (50% ethylene): Inlet: 39° C.; control 171° C.
Autoclave bottom-zone (50% ethylene): Inlet: 35° C.; control 171° C.
Tube $1^{st}$ zone control: 259° C.
Tube $2^{nd}$ zone control: 258° C.
Methyl ethyl ketone (MEK) is used as chain transfer agent. The recycled MEK (after partial conversion in the reactor, partial condensation in the low pressure recycle section and or partial purging) is equally divided over both reactor ethylene feed streams and both AC reaction zones. The fresh make-up MEK (to maintain MEK concentration in order to control MI) is fed into the ethylene feed stream sent to the Autoclave top zone.
For this polymerization, for the average sample $$\frac{Z_1}{Z_2} = 2 \cdot \frac{8533}{8533 + 6751} = 1.12$$

Product Sampling
Samples are taken to measure the rheology response of the polymer, and the average sample (2e) is taken for blown film evaluation. Results are reported in Table 2.

TABLE 2

Example 2 Rheology Results and MEK Concentrations

| Sample* | Melt-index dg/min | Melt-elasticity cN | MEK AC feed Zone 1 Molar ppm | MEK AC feed Zone 2 Molar ppm | Z1/Z2 | ESTI |
|---|---|---|---|---|---|---|
| 2a | 3.07 | 2.02 | 8488 | 6750 | 1.11 | 0.918 |
| 2b | 2.95 | 2.08 | 8532 | 6728 | 1.11 | 0.902 |
| 2c | 3.06 | 2.03 | 8530 | 6747 | 1.11 | 0.905 |
| 2d | 3.01 | 2.02 | 8581 | 6779 | 1.11 | 0.903 |
| 2e | 3.02 | 2.04 | 8533 | 6751 | 1.11 | 0.907 |

*Samples 2a-2d are actual final polymerization samples. Sample 2e represents the average of samples 2a-2d.

Comparative Example 3

Make-Up MEK (CTA) is Equally Divided Over Both Autoclave Reaction Zones (1 and 2)

Reactor pressure: 2440 bar
Autoclave residence time: 55 seconds
Tubular residence time: 80 seconds
Tert-butyl peroxyperpivalate (TBPV) is injected as a free radical initiator in each autoclave reactor zone. At the beginning of the two reactor zones of the tubular reactor a mixture of tert-butyl peroxy-2-ethylhexanoate (TBPO) and di-tert-butyl peroxide (DTBP) is injected as additional free radical initiator.
Temperature Conditions:
Autoclave top-zone (50% ethylene): Inlet: 43° C.; control 171° C.
Autoclave bottom-zone (50% ethylene): Inlet: 40° C.; control 171° C.
Tube $1^{st}$ zone control: 272° C.
Tube $2^{nd}$ zone control: 271° C.
As chain transfer agent methyl ethyl ketone (MEK) is used. The recycled MEK (after partial conversion in the reactor, partial condensation in the low pressure recycle section and/or partial purging) is equally divided over both reactor ethylene feed streams and both AC reaction zones. The fresh make-up MEK (to maintain MEK concentration in order to control/vary MI) is equally divided over both AC reaction zones. Additionally a low level (0.7 vol %) of propylene is maintained in the reactor feed to control the product density.
For this polymerization, for the average sample:

$$\frac{Z_1}{Z_2} = 2 \cdot \frac{4317 * 0.06 + 7000 * 0.0122}{4317 * 0.06 + 7000 * 0.0122 + 4317 * 0.06 + 7000 * 0.0122} = 1$$

Product Sampling:
Samples are taken to measure the rheology response of the polymer, and the average sample (3d) is taken for blown film evaluation. The results are reported in Table 3.

TABLE 3

Comparative Example 3 Rheology Results and MEK Concentration

| Sample* | Melt-index dg/min | Melt-elasticity cN | MEK AC feed Zone 1 Molar ppm | MEK AC feed Zone 2 Molar ppm | Prop AC feed Zone 1 Molar ppm | Prop AC feed Zone 2 Molar ppm | Z1/Z2 | ESTI |
|---|---|---|---|---|---|---|---|---|
| 3a | 0.59 | 9.37 | 4319 | 4319 | 7000 | 7000 | 1.00 | 1.019 |
| 3b | 0.58 | 9.86 | 4293 | 4293 | 7000 | 7000 | 1.00 | 1.024 |
| 3c | 0.61 | 9.43 | 4338 | 4338 | 7000 | 7000 | 1.00 | 1.021 |
| 3d | 0.59 | 9.55 | 4317 | 4317 | 7000 | 7000 | 1.00 | 1.021 |

*Samples 3a-3c are actual final polymerization samples. Sample 3d represents the average of samples 3a-3c.

Inventive Example 4

Make-Up MEK (CTA) is Sent to the Autoclave Top Reaction Zone

Reactor pressure: 2440 bar
Autoclave (AC) residence time: 55 seconds
Tubular residence time: 80 seconds
Tert-butyl peroxyperpivalate (TBPV) is injected as free radical initiator in each autoclave reactor zone. At the beginning of the two reactor zones of the tubular reactor a mixture of tert-butyl peroxy-2-ethylhexanoate (TBPO) and di-tert-butyl peroxide (DTBP) is injected as additional free radical initiator.

Temperature Conditions:
Autoclave top-zone (50% ethylene): Inlet: 43° C.; control 171° C.
Autoclave bottom-zone (50% ethylene): Inlet: 40° C.; control 171° C.
Tube $1^{st}$ zone control: 273° C.
Tube $2^{nd}$ zone control: 271° C.

As chain transfer agent methyl ethyl ketone (MEK) is used. The recycled MEK (after partial conversion in the reactor, partial condensation in the low pressure recycle section and or partial purging) is equally divided over both reactor ethylene feed streams and both autoclave reaction zones. The fresh make-up MEK (to maintain MEK concentration in order to control MI) is fed into the ethylene feed stream sent to the autoclave top zone. No propylene is added to and present in the reactor feeds.

For this polymerization, for the average sample $$\frac{Z_1}{Z_2} = 2 \cdot \frac{6370}{6370 + 5091} = 1.11$$

Product Sampling:
Samples are taken to measure the rheology response of the polymer and the average sample (4d) is taken for blown film evaluation. Results are reported in Table 4.

TABLE 4

Example 4a-4d - Rheology Results and MEK Concentration

| Sample* | Melt-index dg/min | Melt-elasticity cN | MEK AC feed Zone 1 Molar ppm | MEK AC feed Zone 2 Molar ppm | Z1/Z2 | ESTI |
|---|---|---|---|---|---|---|
| 4a | 0.49 | 9.62 | 6377 | 5103 | 1.11 | 0.985 |
| 4b | 0.60 | 9.00 | 6454 | 5164 | 1.11 | 0.968 |
| 4c | 0.58 | 9.13 | 6279 | 5009 | 1.11 | 0.979 |
| 4d | 0.56 | 9.25 | 6370 | 5091 | 1.11 | 0.977 |

*Samples 4a-4c are actual final polymerization samples. Sample 4d represents the average of samples 4a-4c.

Comparative Example 5

Make-Up Propylene (CTA) is Equally Divided Over Both Autoclave Reaction Zones (1 and 2)

Reactor pressure: 2000 bar
Autoclave (AC) residence time: 55 seconds
Tubular residence time: 80 seconds
Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.

Temperature Conditions:
Autoclave top-zone (50% ethylene): Inlet: 40° C.; control 202° C.
Autoclave bottom-zone (50% ethylene): Inlet: 36° C.; control 236° C.
Tube $1^{st}$ zone control: 275° C.
Tube $2^{nd}$ zone control: 275° C.

Propylene is used as the chain transfer agent. The recycled propylene (after partial conversion in the reactor, partial condensation in the low pressure recycle section and/or partial purging) is equally divided over both reactor make up ethylene feed streams and both AC reaction zones. The fresh make-up propylene (to maintain propylene concentration in order to control/vary MI) is equally divided over both AC reaction zones.

Product Sampling

Samples are taken to measure the rheology response and the blown film evaluation. Results are reported in Table 5.

TABLE 5

Comparative Example 5 Rheology Results and Propylene Concentrations

| Sample | Melt-index dg/min | Melt-elasticity cN | Propylene AC feed Zone 1 Molar ppm | Propylene AC feed Zone 2 Molar ppm | Z1/Z2 | ESTI |
|---|---|---|---|---|---|---|
| 5 | 1.07 | 13.10 | 16120 | 16120 | 1 | 1.183 |

Inventive Example 6

Make-Up Propylene (CTA) is Sent to the Autoclave Top Reaction Zone

Reactor pressure: 2000 bar
Autoclave residence time: 55 seconds
Tubular residence time: 80 seconds Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.

Temperature Conditions:

Autoclave top-zone (50% ethylene): Inlet: 40° C.; control 203° C.

Autoclave bottom-zone (50% ethylene): Inlet: 36° C.; control 236° C.

Tube $1^{st}$ zone control: 275° C.

Tube $2^{nd}$ zone control: 275° C.

Propylene is used as chain transfer agent. The recycled propylene (after partial conversion in the reactor, partial condensation in the low pressure recycle section and or partial purging) is equally divided over both reactor make up ethylene feed streams and both AC reaction zones. The fresh make-up propylene (to maintain propylene concentration in order to control MI) is fed into the ethylene feed stream sent to the Autoclave top zone.

Product Sampling

Samples are taken to measure the rheology response and the blown film evaluation. Results are reported in Table 6.

TABLE 6

Example 6 Rheology Results and Propylene Concentrations

| Sample | Melt-index dg/min | Melt-elasticity cN | Propylene AC feed Zone 1 Molar ppm | Propylene AC feed Zone 2 Molar ppm | Z1/Z2 | ESTI |
|---|---|---|---|---|---|---|
| 6 | 0.95 | 13.32 | 15450 | 11470 | 1.15 | 1.156 |

Enhanced Shear Thinning Index (ESTI)

Enhanced shear thinning index is a DMS (dynamic mechanical spectrometry, a.k.a. oscillatory shear rheology, described above) metric, derived from two commonly measured variables that captures broadness or narrowness of MWD of LDPEs, by eliminating the melt index dominant effect. All that is needed is a single frequency sweep from 0.1 rad/s to 100 rad/s at 190° C. The ESTI is defined as:

$$ESTI = \frac{16.77 \cdot |\eta^*(0.1)|^{0.3824}}{|\eta^*(100)|},$$

Where $|\eta^*(w)|$ is the magnitude of the complex viscosity at frequency w.

Figure 6:
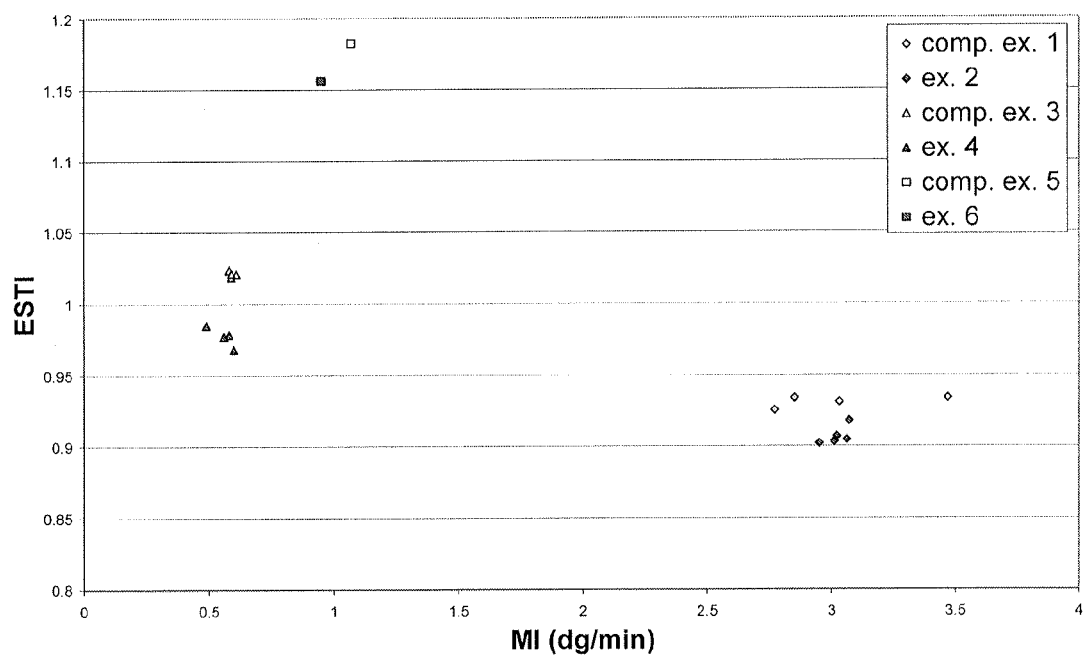
FIG. 6 is a plot of enhanced shear thinning index (ESTI) as a function of melt index (MI) for Comparative Examples 1 and 3 (average values) and 5, and Inventive Examples 2 and 4 (average values) and 6.

Comparative Examples and Inventive Examples 1-4 report a satisfactory agreement between the MWD width as probed by ESTI and MWD width as probed by MI-ME. The ESTI of Comparative Example 5 and Inventive Example 6 also show this narrowing effect as seen in FIG. 6.

TABLE 7

Properties of the Example Polymers

| Example No. | Z1/Z2 | density (kg/m³) | Mw/Mn | MI (dg/min) | ME (cN) |
|---|---|---|---|---|---|
| Comp. Ex. 1a | 1.00 | 931 | 5.64 | 2.77 | 2.38 |
| Comp. Ex. 1b | 1.00 | 931 | 5.34 | 3.47 | 1.96 |
| Comp. Ex. 1c | 1.00 | 930 | 5.56 | 2.85 | 2.30 |
| Comp. Ex. 1d | 1.00 | 930 | 5.51 | 3.03 | 2.21 |
| Example 2a | 1.11 | 930 | 5.23 | 3.07 | 2.02 |
| Example 2b | 1.11 | 931 | 5.34 | 2.95 | 2.08 |
| Example 2c | 1.11 | 930 | 5.44 | 3.06 | 2.03 |
| Example 2d | 1.11 | 931 | 5.43 | 3.01 | 2.02 |
| Example 2e | 1.11 | 930 | 5.36 | 3.02 | 2.04 |
| Comp. Ex. 3a | 1.00 | 927 | 6.11 | 0.59 | 9.37 |
| Comp. Ex. 3b | 1.00 | 927 | 5.92 | 0.58 | 9.86 |
| Comp. Ex. 3c | 1.00 | 925 | 5.79 | 0.61 | 9.43 |
| Comp. Ex. 3d | 1.00 | 927 | 5.94 | 0.59 | 9.55 |
| Example 4a | 1.11 | 929 | 5.83 | 0.49 | 9.62 |
| Example 4b | 1.11 | 929 | 5.45 | 0.60 | 9.00 |
| Example 4c | 1.11 | 929 | 5.75 | 0.58 | 9.13 |
| Example 4d | 1.11 | 929 | 5.68 | 0.56 | 9.25 |
| Comp. Ex. 5 | 1.00 | 919 | 9.62 | 1.07 | 13.10 |
| Example 6 | 1.15 | 919 | 9.61 | 0.95 | 13.32 |

Polymers and Films

Each of the films was formed using the process parameters shown in Table 8. Inventive film 1 was made from a sample of the polymer (density of 0.930 g/cc) made in Example 2 best represented by sample 2e in terms of its polymer rheology characteristics (MI, ME and ESTI). Inventive film 2 was made from a sample of the polymer (density of 0.929 g/cc) made in Example 4 best represented by sample 4d in terms of its polymer rheology characteristics (MI, ME and ESTI).

Inventive film 3 was made from a sample of the polymer (density of 0.919 g/cc) made in Example 6.

Comparative film 1 was made from a sample of the polymer (0.930 g/cc) made in Comparative Example 1 best represented by sample 1d in terms of its polymer rheology characteristics (MI, ME and ESTI).

Comparative film 2 was made from a sample of the polymer (density of 0.927 glee) made in Comparative Example 3 best represented by sample 3d in terms of its polymer rheology characteristics (MI, ME and ESTI).

Comparative film 3 was made from a sample of the polymer (density of 0.919 g/cc) made in Comparative Example 5.

All of the films are made with a "25/1 chrome-coated screw (compression ratio 3/1; feed zone 10D; transition zone 3D; metering zone 12D)," connecting to a "25 mm diameter die." No internal bubble cooling is used. General blown film parameters used to produce the blown film are shown in Table 8. The same conditions were used for all examples and comparative examples. Barrel 1 of the temperature profile is closest to the pellet hopper followed by Barrel 2, which is followed by Barrel 3, which is followed by Barrel 4. The thickness of the films was measured by micrometer.

TABLE 8

Blown Film Fabrication Conditions

| Parameter | |
|---|---|
| Blow up ratio (BUR) | 2.75 |
| Output (kg/hr) | 1.8 |
| Film Thickness (micron) | 50 ± 1.0 |
| Die Gap (mm) | 0.8 |
| Air Temperature (° C.) | 23 |
| Temperature Profile (° C.) | |
| Barrel 1 | 150 |
| Barrel 2 | 165 |
| Barrel 3 | 175 |
| Barrel 4 | 175 |
| Die | 175 |

Figure 3:
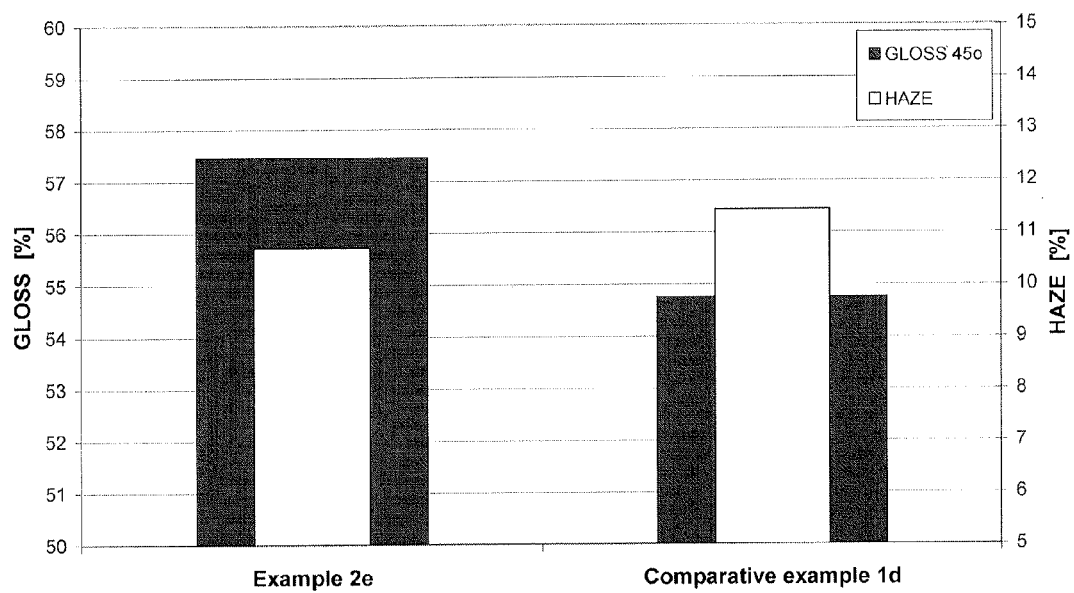
FIG. 3 is a bar graph of optical properties of a blown film made from the polymer of Comparative Example 1 and a blown film made from the polymer of Example 2.
Figure 4:
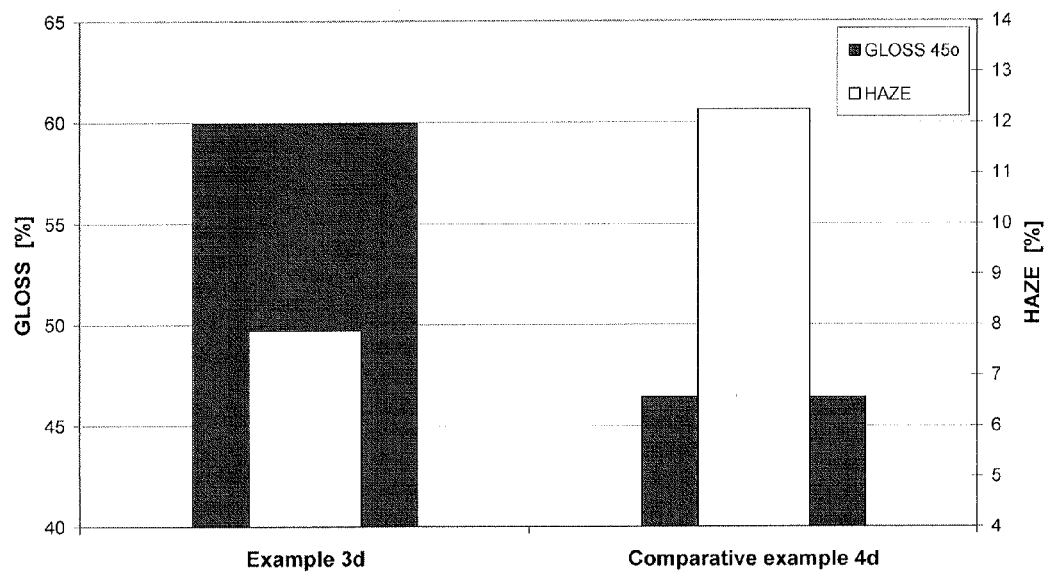
FIG. 4 is a bar graph of optical properties of a blown film made from the polymer of Comparative Example 3 and a blown film made from the polymer of Example 4.
Figure 5:
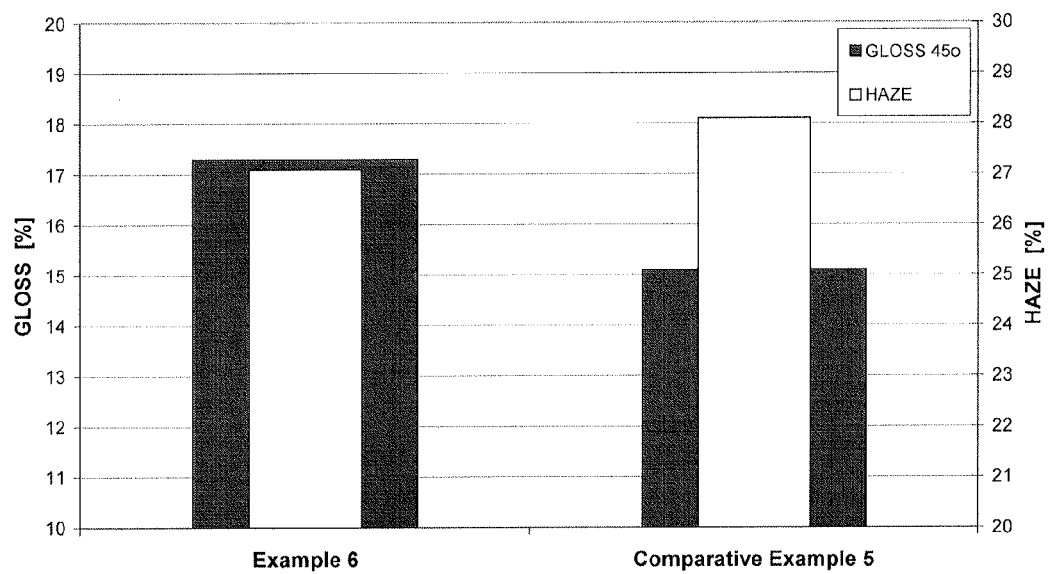
FIG. 5 is a bar graph of optical properties of a blown film made from the polymer of Comparative Example 5 and a blown film made from the polymer of Example 6.

The films and their optical properties are shown in Tables 9-11 below and in FIGS. 3-5, respectively. All averages and standard deviations are based on ten measurements per sample.

TABLE 9

Optical Properties of Blown Film Samples of Comparative Example 1d and Example 2e

| Example No. | Haze (%) | Gloss 45° (%) |
|---|---|---|
| Comparative Example 1d | 11.4 ± 0.4 | 54.8 ± 0.9 |
| Example 2e | 10.7 ± 0.4 | 57.5 ± 1.0 |

TABLE 10

Optical Properties of Blown Film Samples of Comparative Example 3d and Example 4d

| Example No. | Haze (%) | Gloss 45° (%) |
|---|---|---|
| Comparative Example 3d | 12.2 ± 0.2 | 46.4 ± 0.9 |
| Example 4d | 7.9 ± 0.1 | 59.9 ± 0.8 |

TABLE 11

Optical Properties of Blown Film Samples of Comparative Example 5 and Example 6

| Example No. | Haze (%) | Gloss 45° (%) |
|---|---|---|
| Comparative Example 5 | 28.1 ± 0.7 | 15.1 ± 1.9 |
| Example 6 | 27.1 ± 0.6 | 17.3 ± 2.2 |

The polymers produced here are in three melt index classes, one between 2 and 4 dg/min MI, one between 0.4 and 0.7 dg/min MI, and one between 0.9 and 1.1 dg/min. The melt elasticity and the ESTI as a function of melt index are sensitive techniques, and show that a clear trend of lower melt elasticity and lower ESTI are obtained for the inventive examples. This is a direct consequence of the CTA arrangement of this invention, leading to narrower molecular weight distribution. The film measurements under fixed conditions show that this lower melt elasticity translates to better optics. The polymers are as narrow as best-in-class tubular LDPE film products, while being made at advantageous process conditions, primarily higher conversion.

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A high pressure polymerization process to form an ethylene-based polymer, the process comprising the steps of:
   A. Injecting a first feed comprising a chain transfer agent system (CTA system) and ethylene into a first autoclave reactor zone operating at polymerization conditions to produce a first zone reaction product, the CTA system of the first reactor zone having a transfer activity Z1; and
   B. (1) Transferring at least part of the first zone reaction product to a second reactor zone selected from a second autoclave reactor zone or a tubular reactor zone and operating at polymerization conditions, and, (2) freshly injecting, a second feed comprising fresh ethylene without a CTA into the second reactor zone to produce a second zone reaction product comprises a CTA system with a transfer activity of Z2; and
   with the proviso that the ratio of Z1:Z2 is greater than 1.

2. The process of claim 1, further comprising one or more steps of transferring a zone reaction product produced in an (ith−1) reaction zone to an (ith) reaction zone, where 3≤i≤n, and n≥3, each zone operating at polymerization conditions, and optionally adding an (ith) feed comprising a CTA system into the (ith) reaction zone, the CTA system of the (ith) reaction zone having a transfer activity of Zi with the proviso that the ratio of Z1/Zi is greater than 1.

3. The process of claim 1, in which at least part of the first zone reaction product is transferred to a second autoclave reactor zone.

4. The process of claim 1, in which at least part of the first zone reaction product is transferred to a tubular reactor zone.

5. The process of claim 1, in which at least one CTA has a chain transfer constant Cs greater than 0.003.

6. The process of claim 1 in which each of the polymerization conditions in the reactor zones, independently, comprises a temperature greater than, or equal to, 100° C., and a pressure greater than, or equal to, 100 MPa.

7. The process of claim 2 in which the ratio Z1/Z2 and each ratio Z1/Zi are greater than 1.03.

8. The process of claim 2 in which the ratio Z1/Z2 and each ratio Z1/Zi are less than 10.

9. The ethylene-based polymer made by the process of claim 1 comprising a density from 0.926 to 0.94 g/cm$^3$, and a melt index of 0.2 to 5 g/10 min.

10. The ethylene-based polymer of claim 9 in which the polymer is a polyethylene homopolymer.

11. The ethylene-based polymer of claim 9 in which the polymer is an ethylene-based interpolymer.

12. A composition comprising the ethylene-based polymer of claim 11.

13. An article comprising at least one component comprising the ethylene-based polymer of claim 11.

* * * * *